United States Patent
Park et al.

(10) Patent No.: US 8,879,025 B2
(45) Date of Patent: Nov. 4, 2014

(54) TRANSPARENT DISPLAY DEVICE AND ELECTRONIC APPARATUS HAVING THE SAME

(75) Inventors: Jong-Sin Park, Seoul (KR); Eung-Do Kim, Paju (KR); Se-Hong Park, Goyang (KR); Kyung-Ha Lee, Changwon (KR)

(73) Assignee: LG Display Co., Ltd., Seoul (KR)

( * ) Notice: Subject to any disclaimer, the term of this patent is extended or adjusted under 35 U.S.C. 154(b) by 694 days.

(21) Appl. No.: 12/962,236

(22) Filed: Dec. 7, 2010

(65) Prior Publication Data

US 2011/0141388 A1 Jun. 16, 2011

(30) Foreign Application Priority Data

Dec. 10, 2009 (KR) .................. 10-2009-0122777

(51) Int. Cl.
*G02F 1/1335* (2006.01)
(52) U.S. Cl.
CPC ...... *G02F 1/13362* (2013.01); *G02F 1/133528* (2013.01); *G02F 1/133615* (2013.01); *G02F 2001/133562* (2013.01); *G02F 2001/133618* (2013.01)
USPC .................................. 349/65; 349/96; 349/62

(58) Field of Classification Search
None
See application file for complete search history.

(56) References Cited

U.S. PATENT DOCUMENTS

| | | | |
|---|---|---|---|
| 6,128,059 A * | 10/2000 | Nishiguchi | 349/129 |
| 7,021,812 B2 | 4/2006 | Maeda et al. | |
| 7,619,703 B2 * | 11/2009 | Yun et al. | 349/113 |
| 2003/0017856 A1 * | 1/2003 | Kotchick et al. | 455/566 |
| 2004/0113162 A1 * | 6/2004 | Mai | 257/88 |
| 2005/0157224 A1 | 7/2005 | Kanbe et al. | |
| 2007/0069978 A1 * | 3/2007 | Daiku | 345/8 |
| 2008/0231773 A1 | 9/2008 | Daiku | |
| 2009/0040428 A1 * | 2/2009 | Shimura | 349/65 |

FOREIGN PATENT DOCUMENTS

| | | |
|---|---|---|
| CN | 101086540 A | 12/2007 |
| CN | 101271227 A | 9/2008 |
| JP | 4-138423 A | 5/1992 |
| TW | 200717124 A | 5/2007 |
| TW | 200848878 A | 12/2008 |
| WO | WO 03/001286 A1 | 1/2003 |

* cited by examiner

*Primary Examiner* — Wen-Ying P Chen
(74) *Attorney, Agent, or Firm* — Birch, Stewart, Kolasch & Birch, LLP

(57) ABSTRACT

A transparent display device for enhancing optical transmissivity in a transparent mode, is discussed. The transparent display device may include a liquid crystal panel; a light source disposed at one side of a lower portion of the liquid crystal panel to emit light; a first polarizing plate for polarizing the light emitted from the light source; a light guide plate disposed at a lower portion of the liquid crystal panel to totally reflect the light polarized to an axis by the first polarizing plate to a lateral surface thereof and supply to the liquid crystal panel, and transmit natural light entered from a lower direction therethrough; and a second polarizing plate disposed at an upper portion of the liquid crystal panel to control the amount of polarized light passing through the liquid crystal panel.

2 Claims, 4 Drawing Sheets

TRANSPARENT DISPLAY DEVICE AND ELECTRONIC APPARATUS HAVING THE SAME

CROSS-REFERENCE TO RELATED APPLICATIONS

Pursuant to 35 U.S.C. §119(a), this application claims the benefit of earlier filing date and right of priority to Korean Application No. 10-2009-0122777 filed on Dec. 10, 2009, the contents of which is incorporated by reference herein in its entirety.

BACKGROUND OF THE INVENTION

1. Field of the Invention

The present invention relates to a transparent display device, and more particularly, to a transparent display device in which optical transmissivity in a transparent mode is enhanced to clearly display an image at the rear side thereof.

2. Description of the Related Art

In recent years, with rising interests in information displays and increasing demands to use portable information media, researches and commercialization of light-weight and thin-profile flat panel displays (FPDs) for substituting traditional displays such as cathode ray tubes (CRTs) have been actively carried out. In particular, among such FPDs, a liquid crystal display (LCD), which is a device displaying images using an optical anisotropy of liquid crystal molecules, has been actively applied to a notebook, a desktop monitor, or the like, because it is excellent in the resolution, color representation, image quality, and the like.

On the other hand, studies on a transparent display device for allowing rear objects thereof to be seen as well as capable of implementing images thereon have been actively carried out. Such a transparent display device may be applicable to vehicle front glasses or house glasses to provide the user's desired information. Therefore, the applicability of such transparent display devices may be expected to be drastically increased.

In general, it may be used an organic light-emitting display device and the like using spontaneous light for the transparent display device.

However, in case of the organic light-emitting display device, a display device thereof can be made only to be transparent, and thus it may be impossible to turn on or off the transparency to make it transparent or implement an image thereon. Also, there are various problems such as low yield, difficulty in making a large-sized display, low reliability, and the like.

As a result, it may be required to develop a liquid crystal display device capable of implementing high yield, large-sized displays, high reliability, as well as capable of implementing wide viewing angle, high luminance, high contrast ratio and full color as a transparent display device, but the liquid crystal display device cannot be used as a transparent display device. However, the liquid crystal display cannot spontaneously emit light but implement an image by using light of the backlight because a non-transparent backlight unit should be provided at a rear surface of the liquid crystal panel and also polarizing plates should be provided at both front and rear surfaces of the liquid crystal panel, respectively, to control the transmission of light. In particular, the polarizing plates provided at both front and rear surfaces of the liquid crystal panel, respectively, allows light to be transmitted therethrough when liquid crystals are driven in the liquid crystal panel, but light is in a non-transparent state when liquid crystals are not driven, and thus it is impossible to implement a transparent display.

SUMMARY OF THE INVENTION

The present invention is contrived to solve the aforementioned problem and an object of the invention is to provide a transparent display in which a polarizing plate disposed at a front surface of a liquid crystal panel is detachably disposed to remove the polarizing plate in a transparent mode and dispose the polarizing plate in an image mode, thereby enhancing optical transmissivity in the transparent mode.

Another object of the present invention is to provide an electronic apparatus with the foregoing transparent display device.

In order to accomplish the foregoing object, a transparent display device may include a liquid crystal panel; a light source disposed at one side of a lower portion of the liquid crystal panel to emit light; a first polarizing plate for polarizing the light emitted from the light source; a light guide plate disposed at a lower portion of the liquid crystal panel to reflect totally the light polarized in an axis-direction by the first polarizing plate to a lateral surface of the light guide plate to supply the light into the liquid crystal panel, and transmit natural light entered from a lower direction therethrough; and a second polarizing plate disposed at an upper portion of the liquid crystal panel to control the amount of the polarized light passing through the liquid crystal panel, the second polarizing plate being detachably disposed at an upper portion of the liquid crystal panel, wherein the second polarizing plate is disposed at an upper portion of the liquid crystal panel to display an image implemented by the liquid crystal panel when a signal is applied to the liquid crystal panel and the second polarizing plate is removed to display a rear side of the liquid crystal panel by natural light passing through the liquid crystal panel when a signal is not applied to the liquid crystal panel.

The optical axes of the first polarizing plate and second polarizing plate may be perpendicular to each other, and the light guide plate may include a first refraction layer having a first refractive index; and a second refraction layer having a second refractive index greater than the first refractive index, which is disposed on the first refraction layer.

According to the present invention, a polarizing plate disposed at a front surface of the liquid crystal panel of a transparent display device is detachably provided such that the polarizing plate is disposed to display an image when implementing the image or the polarizing plate is removed to maximize the transmissivity of light entered from a rear surface of the transparent display device and passed through the transparent display device display, thereby clearly displaying a scenery at a rear side of the transparent display device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, embodiments of the present invention will be described in detail with reference to the accompanying drawings.

According to the present invention, there is provided a transparent display device. In particular, according to the present invention, there is provided a display device in which transmissivity is enhanced in a transparent mode, thereby allowing the user to clearly view an object at a rear side of the display device. In addition, according to the present invention, there is provided a transparent display device capable of selecting a transparent mode or a image mode as occasion demands.

Figure 1:
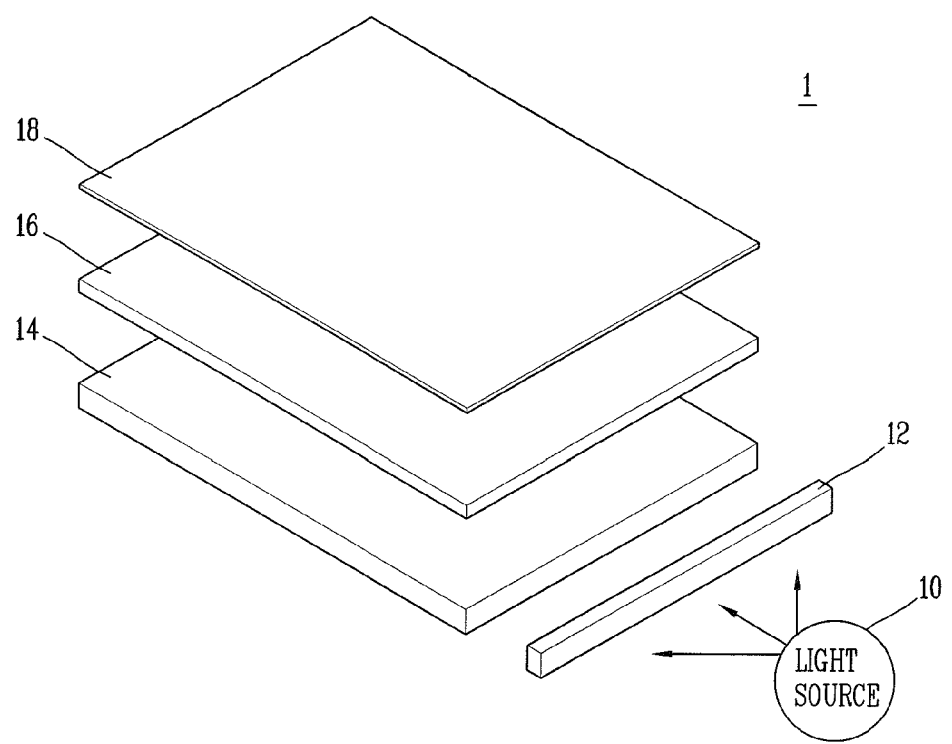
FIG. 1 is a view illustrating the structure of a transparent display device according to the present invention.

FIG. 1 is a view illustrating the structure of a transparent display device 1 according to a first embodiment of the present invention.

As illustrated in FIG. 1, a transparent display device 1 according to the present invention may include a liquid crystal panel 16, a light guide plate 14 disposed at a lower portion of the liquid crystal panel 16 to guide light to the liquid crystal panel 16, a light source 10 disposed at a lateral surface of the light guide plate 14 to emit light to the light guide plate 14, a first polarizing plate 12 disposed between the light source 10 and a lateral surface of the light guide plate 14 to polarize the light emitted from the light source to enter into the light guide plate 14, and a second polarizing plate 18 disposed at an upper portion of the liquid crystal panel 16 to polarize light transmitting through the liquid crystal panel 16.

The light source 10 is disposed in a lateral direction of the light guide plate 14. For the light source 10, it may be used a fluorescent lamp such as a cold cathode fluorescence lamp (CCFL) or external electrode fluorescent lamp (EEFL), or a plurality of light emitting devices (LEDs). In case of using LEDs, it may be used an LED that emits monochromatic light such as red, green, blue, and the like or a white LED that emits white light.

The light emitted from the light source 10 may include a first polarized light (vertical polarized light) and a second polarized light (horizontal polarized light) as visible light. The first polarizing plate 12 may be adhered to a lateral portion of the light guide plate 14. The first polarizing plate 12 is allowed to transmit only a first polarized light among the light including the first polarized light and the second polarized light.

If the light emitted from the light source 10 is entered into the first polarizing plate 12, then a second polarized light component of the light is absorbed by the first polarizing plate 12 to transmit only a first polarized light through the first polarizing plate 12. The light guide plate 14 allows the first polarized light that has passed through the first polarizing plate 12 to be entered into the liquid crystal panel 16 at an upper portion thereof.

Figure 2:
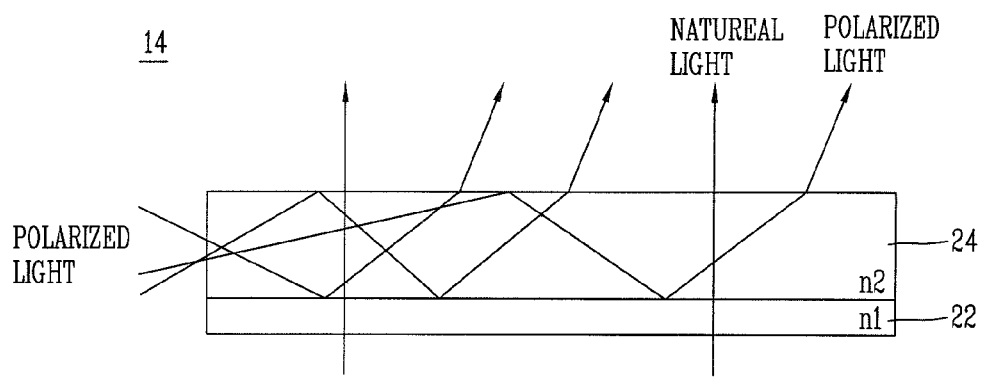
FIG. 2 is a view illustrating the total reflection of light in a light guide plate of a transparent display device according to the present invention.

As illustrated in FIG. 2, the light guide plate 14 may include a first refraction layer 22 and a second refraction layer 24.

The second refraction layer 24 is disposed to be adjacent to the liquid crystal panel 16, and the first refraction layer 22 is disposed at a lower portion of the second refraction layer 24. In other words, the first refraction layer 22 is formed and then the second refraction layer 24 is formed thereon. The first refraction layer 22 is a material having a first refractive index (n1), and may be composed of fluorinated calcium ($CaF_2$) or fluorinated magnesium ($MgF_2$), and the like. At this time, the refractive index of fluorinated calcium ($CaF_2$) is 1.35 and the refractive index of fluorinated magnesium ($MgF_2$) is 1.38. The second refraction layer 24 is a medium having a second refractive index (n2), and may be composed of a high molecular substance, such as polymer methyl methacrylate, plastic, or glass. At this time, the second refractive index (n2) may be within a range of 1.49-1.50.

As described above, since the second refractive index (n2) is greater than the first refractive index (n1), the first polarized light entered to the light guide plate 14 is totally reflected at an interface between the first refraction layer 22 and the second refraction layer 24 and entered into the liquid crystal panel 16 at an upper portion thereof. Total reflection is to reflect all light having an angle greater than the critical angle, and the critical angle ($\theta c$) may be determined by arcsin (n2/n1). Accordingly, the more the first refractive index (n1) is greater than the second refractive index (n2), the less the critical angle ($\theta c$) becomes, and thus the probability becomes higher that the first polarized light is totally reflected.

On the other hand, natural light is entered at a lower surface, i.e., from a lower direction. Natural light is passed through the first refraction layer 22 and second refraction layer 24 and entered into the liquid crystal panel 16. The transparent liquid crystal display device according to the present invention may be in a transparent state by such natural light irrespective of displaying images. Accordingly, the user at the front of the display can see an object below the light guide plate.

The liquid crystal panel 16 includes a liquid crystal layer, and thus liquid crystal molecules in the liquid crystal layer may be driven to change the phase of the first polarized light. The phase of the first polarized light that can be changed by driving liquid crystal molecules may be within a range of 0 to 90 degrees.

As described above, natural light is entered into the liquid crystal panel 16 through a bottom surface of the light guide plate 14. The natural light includes both a first polarized light and a second polarized light. Accordingly, both the first and second polarized lights in natural light are entered into the liquid crystal panel 16, and thus the user is allowed to view an object at the bottom surface irrespective of driving liquid crystals, i.e., displaying an image.

The second polarizing plate 18 has an optical axis perpendicular to that of the first polarizing plate 12. Thus, optical transmissivity may be controlled according to the phase of first polarized light being varied by driving liquid crystals. For example, the first polarized light will not be passed therethrough by the second polarizing plate in case where the phase of the first polarized light is zero degrees, but the amount of the first polarized light passed therethrough by the second polarizing plate will be increased as increases the phase of the first polarized light. As increases the amount of the first polarized light, it is possible to obtain a higher gradation.

The second polarizing plate 18 is detachably disposed at an upper portion of the liquid crystal panel 16. In other words, the second polarizing plate 18 can be disposed or removed at an upper portion of the liquid crystal panel 16 as occasion demands. In this manner, the second polarizing plate 18 is detachably disposed to increase luminance in a transparent mode and enhance the transparency, thereby allowing the user to clearly view an object at a rear surface of the display device. It will be described in more detail as follows.

In the transparent mode, i.e., when a signal is not applied to the liquid crystal panel 16, natural light passing through the liquid crystal panel 16 is exited while passing through a liquid crystal layer thereof. The transmitted light is polarized and exited while being passed through the second polarizing plate 18. However, most of light passed through the liquid crystal panel 16 and second polarizing plate 18 is absorbed at the liquid crystal panel 16 and second polarizing plate 18, and thus the luminance of an image actually shown to the user is drastically reduced. Typically, about 30% of light is absorbed when passing through the color filter layer of the liquid crystal panel 16 and about 40% of light is transmitted when passing through the second polarizing plate 18, and thus light actually exited from a liquid crystal display device is only about 30% of natural light, thereby drastically reducing the transparency of a display device in a transparent mode.

However, according to the present invention, the second polarizing plate 18 is detachably disposed at a front surface of the liquid crystal display device, and the second polarizing plate 18 is removed in a transparent mode, thereby allowing all light passed through the liquid crystal panel 16 to be exited to the outside of the liquid crystal display device. Furthermore, in an image mode, the second polarizing plate 18 is disposed at a front surface of the liquid crystal panel 16, and thus the transmissivity of light that has been polarized by the first polarizing plate 12 and then passed through the liquid crystal panel 16 to change the polarizing state may be controlled by the second polarizing plate 18, thereby implementing an image.

In this manner, according to the present invention, the second polarizing plate 18 is detachably provided at a front surface of the liquid crystal panel 16, and the second polarizing plate 18 is adhered when an image is implemented on the liquid crystal display device 1 and the second polarizing plate 18 is removed when an image is not implemented, thereby allowing the user to enjoy an image with high quality as well as view an object at the rear side of the liquid crystal display device 1 with clear transparency.

Hereinafter, an actual embodiment to which the present invention is applied will be described in detail.

Figure 3:
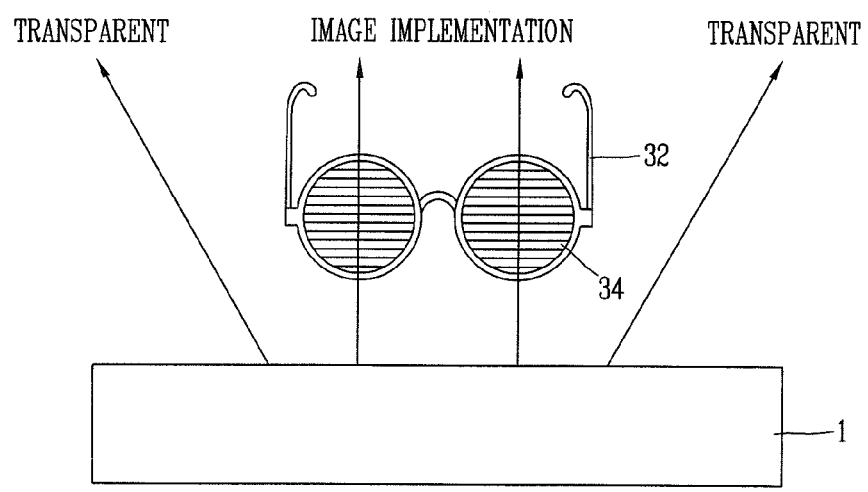
FIG. 3 is a view illustrating a liquid crystal display device according to a first embodiment of the present invention.

FIG. 3 is a view illustrating a liquid crystal display device according to a first embodiment of the present invention.

As illustrated in FIG. 3, according to this embodiment, it may be configured with a transparent liquid crystal display device 1 in which a polarizing plate at an upper portion of the of the liquid crystal panel is removed and polarizing glasses 32 for allowing the user to enjoy an image implemented on the transparent liquid crystal display device 1. The polarizing glasses 32 are adhered to the polarizing plate 34 to polarize light entered into an eye of the person wearing the polarizing glasses 32. An optical axis of the polarizing glasses 32 is made perpendicular to an optical axis of a polarizing plate provided in the liquid crystal display device 1, i.e., a polarizing plate disposed at a lateral surface of the light guide plate in the liquid crystal display device 1 having a structure as illustrated in FIG. 1 to supply polarized light to the liquid crystal panel.

The transparent liquid crystal display device 1 is identical to a structure in which a second polarizing plate disposed at an upper portion of the liquid crystal panel is removed from the structure as illustrated in FIG. 1. Accordingly, in a transparent mode, i.e., in case where a signal is not applied to the liquid crystal panel, all natural light supplied from a lower portion of the liquid crystal panel is passed through the liquid crystal panel, and then exited without being polarized by a polarizing plate to enhance optical transmissivity, thereby allowing the user to clearly view an object at a rear surface of the liquid crystal panel. Even in an image mode, i.e., in case where a signal is applied to the liquid crystal panel, natural light is passed through the liquid crystal panel as it is, thereby allowing the user to clearly view an object at a rear surface of the liquid crystal panel. In other words, in case of viewing the liquid crystal display device 1 with no polarizing glasses 32, the liquid crystal display device 1 will be always transparently viewed.

Furthermore, light that has been polarized at a first polarizing plate of the liquid crystal display device having the structure as illustrated in FIG. 1 and entered into the light guide plate changes the polarizing state to be exited while passing through a liquid crystal layer of the liquid crystal panel. If the exited light is passed through the polarizing plate 34 of the polarizing glasses 32, then transmissivity is controlled by the polarizing plate 34, thereby allowing the user to view an image. In addition, light that has existed from the liquid crystal panel to a region other than the polarizing glasses 32 is not passed through the light guide plate, and thus an image is not implemented, and as a result, the image will not be viewed in a region other than that of light passing through the polarizing glasses 32 but only an object at the rear side of the liquid crystal display device 1 will be transparently viewed.

In this manner, according to the present invention, the liquid crystal display device is used as a transparent display device because the user does not wear polarizing glasses 32 in an off-mode of the liquid crystal display device, and the user wears the polarizing glasses 32 only in case where a signal is applied to the liquid crystal display device to enjoy an image. At this time, the polarizing glasses 32 are not used in a transparent mode, and thus the absorption of light can be minimized, thereby allowing the user to clearly view a rear surface of the liquid crystal display device 1.

Furthermore, according to this embodiment, even in case where a signal is applied to the liquid crystal display device 1, a image will be recognized only by the user who wearing the polarizing glasses 32, but only an object at a rear surface of the transparent liquid crystal display device 1 will be viewed by the user who not wearing the polarizing glasses 32, thereby protecting the privacy of the user while the user enjoys an image.

Figure 4A:
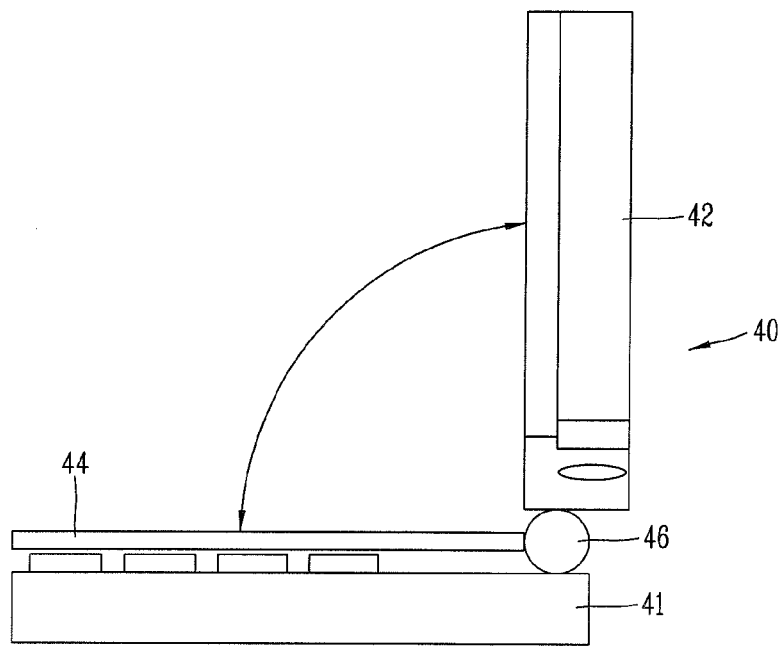
FIGS. 4A and 4B are views illustrating a liquid crystal display device according to a second embodiment of the present invention.
Figure 4B:
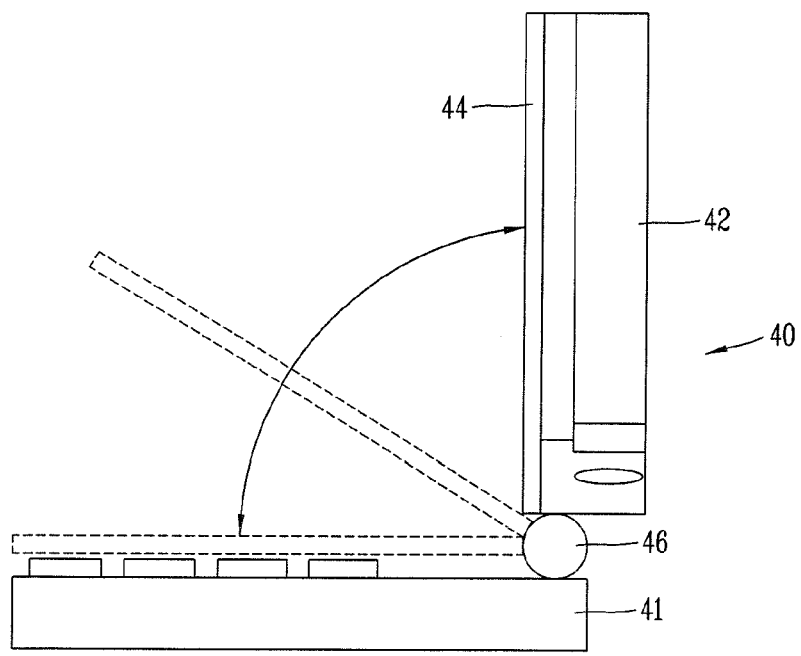

FIGS. 4A and 4B are views illustrating a liquid crystal display device according to a second embodiment of the present invention, particularly, a view illustrating a case where the present invention is applied to a notebook computer.

As illustrated in FIGS. 4A and 4B, a notebook computer 40 according to this embodiment may include a main body 41 in which various processors and the like are incorporated thereinside and a keyboard for inputting information is formed thereoutside, a monitor 42 configured with a transparent liquid crystal display device to implement an image according to information inputted from the main body 41 and allow the user to view an object at the rear surface, and a polarizing plate 44 provided at the main body 41 and rotated by a hinge 46 to be disposed at a front surface of the monitor 42. The liquid crystal display device has a structure in which a second polarizing plate at an upper portion of the liquid crystal panel is removed from the transparent liquid crystal display device as illustrated in FIG. 1.

As illustrated in FIG. 4A, in case where the notebook computer 40 is turned off (a signal is not applied to the liquid crystal panel) when the polarizing plate 44 is placed on the main body 41, i.e., when the polarizing plate 44 is not placed at a front surface of the monitor 42, all natural light supplied from a lower portion of the liquid crystal panel is passed through the liquid crystal panel thereby allowing the user to clearly view an object at a rear surface of the monitor 42 in the notebook computer 40. Even in case where the notebook computer 40 is turned on (a signal is applied to the liquid crystal panel), all natural light supplied from a lower portion of the liquid crystal panel is passed through the liquid crystal panel, thereby allowing the user to clearly view an object at a rear surface of the monitor 42.

As illustrated in FIG. 4B, in case where the polarizing plate 44 is rotated to dispose the polarizing plate 44 at a front surface of the monitor 42, light that has been polarized at a first polarizing plate of the liquid crystal display device having the structure as illustrated in FIG. 1 and entered into the light guide plate changes the polarizing state to be exited while passing through a liquid crystal layer of the liquid crystal panel. If the exited light is passed through the polarizing plate 44 disposed at a front surface of the monitor 42, then optical transmissivity is controlled by the polarizing plate 44 to implement an image.

In this manner, according to this embodiment, the polarizing plate 44 is disposed at a front surface of the monitor 42 to implement an image when the notebook computer 40 is operated to view information such as an image and the like through the monitor 42, and the polarizing plate 44 is disposed at the main body 41 to allow the user to view an object at a rear surface of the monitor 42 when the notebook computer 40 is not operated. Also, if the polarizing plate 44 is not disposed at a front surface of the monitor 42 even in case where the notebook computer 40 is operated, then an image will not be implemented.

In addition, according to this embodiment, when the notebook computer 40 is not operated, light supplied from a rear surface of the monitor 42 to the liquid crystal display device is passed through the monitor 42 without passing through a separate polarizing plate, and thus the light absorption by the liquid crystal display device can be minimized, thereby allowing the user to clearly view an object at a rear surface of the monitor 42.

Figure 5A:
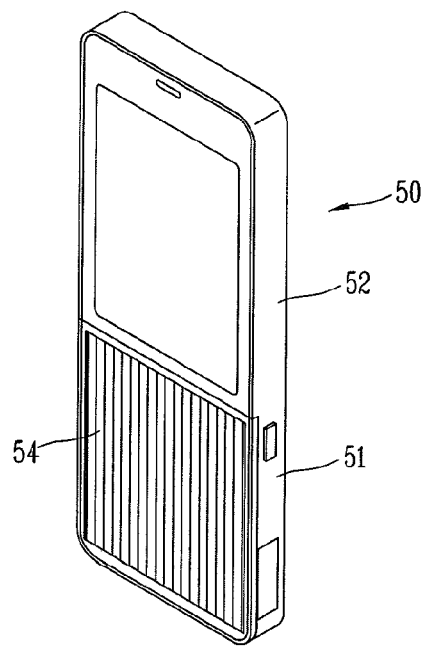
FIGS. 5A and 5B are views illustrating a liquid crystal display device according to a third embodiment of the present invention.
Figure 5B:
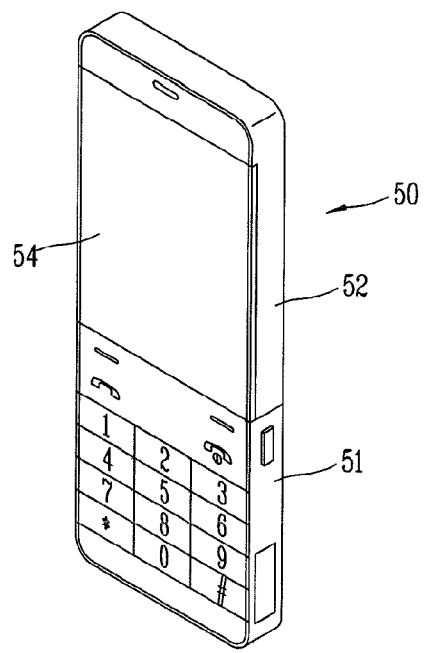

FIGS. 5A and 5B are views illustrating a liquid crystal display device according to a third embodiment of the present invention, and in this embodiment, it is characterized in that a slide polarizing plate is mounted at a front surface of the monitor in a portable electronic apparatus such as a mobile phone.

As illustrated in FIGS. 5A and 5B, a notebook computer 50 according to this embodiment may include a main body 51 in which various processors and the like are incorporated thereinside and a keypad for inputting information is formed there-outside, a monitor 52 configured with a transparent liquid crystal display device to implement an image according to information inputted from the main body 51, and a polarizing plate 54 provided at the main body 51 to slidably move between a front surface of the monitor 52 and the main body 51 along a guide (not shown). At this time, the monitor 52 may include a liquid crystal display device, and the liquid crystal display device has a structure in which a second polarizing plate at an upper portion of the liquid crystal panel is removed from the transparent liquid crystal display device as illustrated in FIG. 1.

As illustrated in FIG. 5A, in case where the portable electronic apparatus 50 is turned off when the polarizing plate 54 is placed on the main body 51, i.e., when a signal is not applied to the liquid crystal panel, all natural light supplied from a lower portion of the liquid crystal panel is passed through the liquid crystal panel, and thus a rear surface of the monitor 52 in the portable electronic apparatus 50 will be clearly viewed by the user. Even in case where the portable electronic apparatus 50 is turned on, i.e., when a signal is applied to the liquid crystal panel, all natural light supplied from a lower portion of the liquid crystal panel is passed through the liquid crystal panel, thereby allowing the user to clearly view an object at a rear surface of the monitor 52.

As illustrated in FIG. 5B, in case where the polarizing plate 54 is slidably moved to dispose the polarizing plate 54 at a front surface of the monitor 52, light that has been polarized at a first polarizing plate of the liquid crystal display device having the structure as illustrated in FIG. 1 and entered into the light guide plate changes the polarizing state to be exited while passing through a liquid crystal layer of the liquid crystal panel. If the exited light is passed through the polarizing plate 54 disposed at a front surface of the monitor 52, then optical transmissivity is controlled by the polarizing plate 54 to implement an image.

In this manner, according to this embodiment, the polarizing plate 54 slidably moved and disposed at a front surface of the monitor 52 to implement an image when the portable electronic apparatus 50 is operated to view information such as an image and the like through the monitor 52, and the polarizing plate 54 is slidably moved and disposed at the main body 51 to allow the user to view an object at a rear surface of the monitor 52 when the portable electronic apparatus 50 is not operated. Also, if the polarizing plate 54 is not disposed at a front surface of the monitor 52 even in case where the portable electronic apparatus 50 is operated, then an image will not be implemented.

In addition, according to this embodiment, when the portable electronic apparatus 50 is not operated, light supplied from a rear surface of the monitor 52 to the liquid crystal display device is passed through the monitor 52 without passing through a separate polarizing plate, and thus the light absorption by the liquid crystal display device can be minimized, thereby allowing the user to clearly view an object at a rear surface of the monitor 52.

As described above, according to the present invention, a polarizing plate disposed at a front surface of the liquid crystal panel in a transparent liquid crystal display device is removed in a transparent mode, and disposed only in an image mode, thereby enhancing optical transmissivity in the transparent mode and allowing the user to clearly view a rear side of the liquid crystal display device.

Furthermore, according to the present invention, such a liquid crystal display device may be applicable to a display device, a notebook computer, a portable electronic apparatus, and the like.

However, the present invention is not merely applicable to such particular products but may be also applicable to various other products. In other words, it may be applicable to every product in which a transparent liquid crystal display device is applied to selectively implement a transparent mode and an image mode as occasion demands.

Moreover, a transparent liquid crystal display device according to the present invention is not merely limited to a transparent liquid crystal display device with a particular structure. For example, though there is disclosed a transparent display device having a structure in which a transparent light guide plate is provided therein and a first polarizing plate is disposed at a lateral surface of the light guide plate allowing first polarized light to be entered into a liquid crystal panel through the light guide plate in the detailed description, the present invention is not merely limited to the transparent display device having such a structure, and may be also applicable to a transparent display device having any structure. In particular, it may be applicable to a transparent display device having any structure in which a polarizing plate is provided at an upper portion of the liquid crystal panel.

In other words, other examples or embodiments of a liquid crystal display device using the basic concept of the present invention can be easily contrived by those skilled in the art.

What is claimed is:

1. A transparent display device, comprising:
   a liquid crystal panel;
   a light source disposed at one side of a lower portion of the liquid crystal panel to emit light;
   a polarizing plate configured to polarize the light emitted from the light source;
   a light guide plate disposed at a lower portion of the liquid crystal panel to reflect totally the light polarized in an axis-direction by the first polarizing plate to a lateral surface of the light guide plate to supply the light into the liquid crystal panel, and transmit natural light entered from a lower direction therethrough; and
   polarizing glasses configured to control an amount of polarized light passing through the light guide plate,
   wherein the light polarized by the polarizing plate is directly supplied to the liquid crystal panel without a variation of a polarizing state thereof and the polarizing glasses are worn to recognize an image implemented by the liquid crystal panel when a signal is applied to the liquid crystal panel, an un-polarized natural light from a rear side passes the light guide plate to supply directly the un-polarized natural light to the liquid crystal panel to display an objection at a rear side of the liquid crystal panel when the signal is not applied to the liquid crystal panel.

2. The transparent display device of claim 1, wherein an optical axis of the polarizing glasses is perpendicular to an optical axis of the polarizing plate.

* * * * *